No Printed Specification Available
9511X
J. McClory,
Lock.
Patented Mar. 18, 1836.
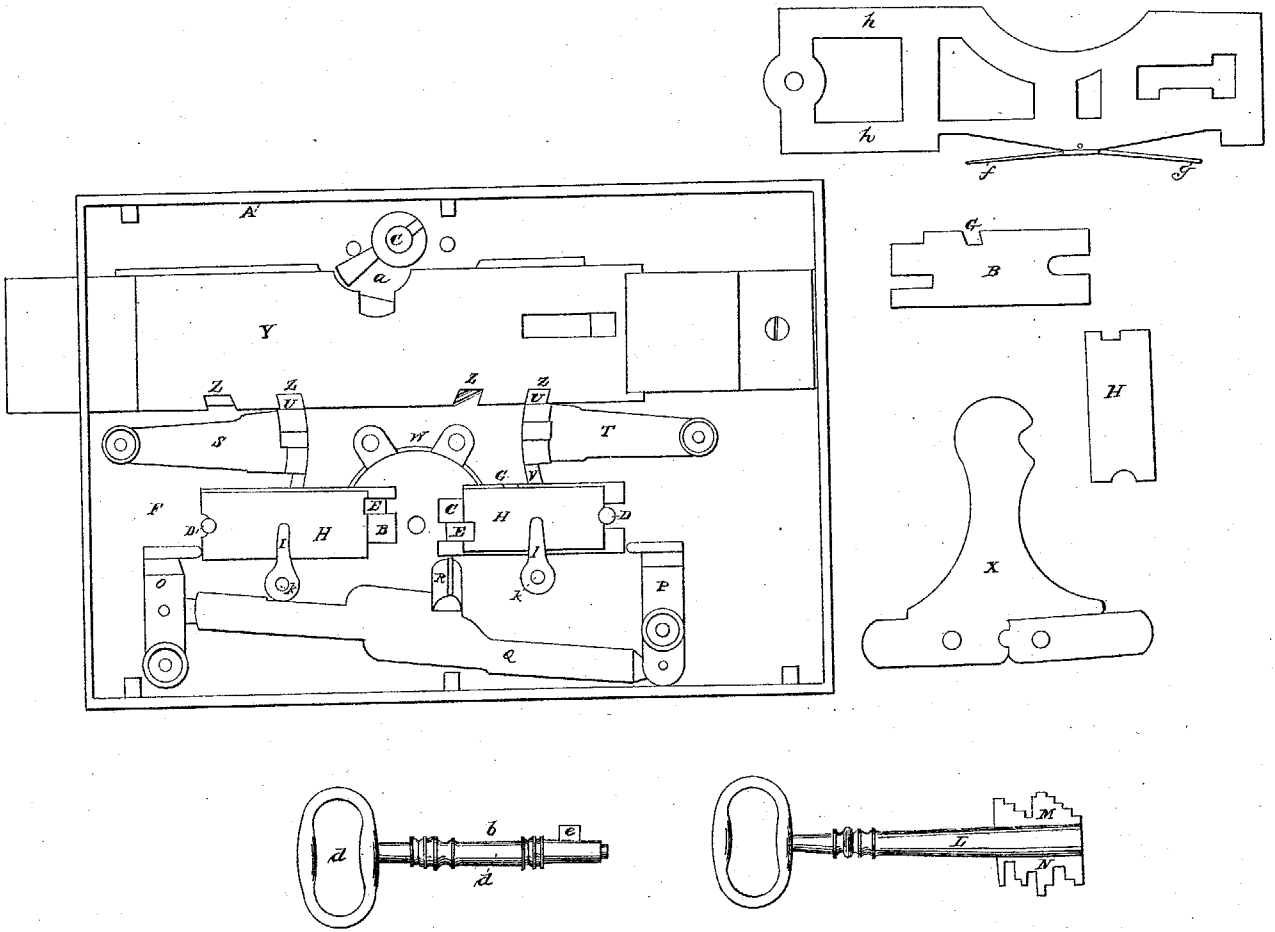
AM. PHOTO-LITHO. CO. N.Y. (OSBORNE'S PROCESS.)

Ar. 15

Mar 18 1836

James Mc Clory City N.Y.

Letters Patent

X9511

The Schedule referred to in these Letters Patent and making part of the
same Containing a description in the words of the said James Mc Clory
himself of his improvement in the Door Lock.
Be it known that I James Mc Clory of the City County and State of
New York have made an improvement in the Door Lock which is de-
-scribed as follows: reference being had to the annexed drawings of the
same making part of this Specification. The Stock or Case A of this lock
is made similar to that in common use. Within this case are placed the
sets of guards B.C. each guard having a slot in each end thereof working
over permanent studs D.E. set in the plate F of the stock to keep the guards
in their places. In the upper edge of each guard is a notch G to receive
the check hereafter described, these notches are made at different distan-
-ces from the ends of the guards. Between every pair of guards is placed a plate
of tin H to cause them to slide independently of each other. On the upper or
outer plate of tin a spring I is made to press secured to a permanent stud
K or this spring may be dispensed with. These guards are thrown hori-
-zontally backwards and forwards by a key L having two bits M N each
consisting of a series of steps or projections of different lengths corresponding
in number to the guards on which they act. The centre of the key pin is
made hollow in order to pass over a [illegible] pin set in the plate on which it
turns when the lock is worked only on one side, but when worked on
both sides there must be a [illegible] for the key in the usual manner on
both sides. There are two levers O.P. for returning the guards to their for-
-mer positions which levers turn on pins at one end fixed in the plate and
are connected together by a bar Q having a projection R in its centre
on which the key acts. There are two checks S.T. turning vertically on pins
fixed in the plate; the upper side of each check has a projection U which
drops into a corresponding notch in the lower edge of the bolt, and on the
under side of said check is a similar projection V which drops into the notches of the guards A Curved piece of Metal or roundabout W is placed
between the guards and the bolt to shut off all communication from the
[illegible] key hole with the bolt A plate of iron X turning on a pivot is
Connected at one end to one of the checks by a small projection which drops
into a groove in the check for covering the key hole of the bolt key hereafter
described. The bolt Y is made something similar to the common bolt but
has four notches Z on its lower edge to admit the checks to rise into them by
which it is secured and an opening a to admit the bolt key by which
it is thrown forward and back. The key b by which the bolt is moved is
made in two parts the first part consists of a key bit c which fits into the open
-ing in the bolt for working it. The second part consists of the outer key d hav
-ing a tooth or projection e which fits in the key bit for turning it, the key
bit turning on a round pin fixed in the plate, Under the bolt are two
springs f g attached to a common [illegible] for turning the checks into the
notches of the guards A common lock cap is put over the before described
works secured by rivets and screws It will be perceived that two keys are
made use of with this lock one to move the bolt - the other to place the guards
in such a position that the notches in the same may correspond with each
other in order that the bolt may be locked or unlocked by the bolt key, This is
accomplished in the following manner, The guard key having two bits as
before described each containing a number of steps differing in their
lengths from the centre of the key pin, each bit therefore has to act on a
separate set of guards, which before the key is turned present a plane
surface but when the key is turned the bits come in contact with the
ends of the guards which give way, to the purpose of the various steps
or projections of the bits producing a similar variation in the position
of the guards but causing the notches in the same to correspond exactly
one above the other forming a groove from the cap to the plate, the checks
then fall into the notches from their gravity or from the action of the springs
above them. The bolt being now released the bolt key is inserted & turned
& the bolt thrown forward, the motion of the guard key is then reversed
which raises the check by the action of one of the guards acting on the
principle of the wedge forcing the check up into the notch of the bolt

X9511 and thus secures it. It must be observed that in turning the guard key
the plate which covers the key hole of the bolt is removed and that, when the
bolt is withdrawn and the motion of the guard key reversed that this
plate again returns to its former position over the key hole and effectually
secures it from the introduction of picks or other implements. By thus hav-
-ing the guards of an uniform length and presenting an even and plain
surface the possibility of taking an impression for the purpose of making
a false key is effectually prevented. And besides by the before described
construction the door lock is rendered much cheaper, more durable and
less liable to be picked than any lock known. All that I claim as new
and of my invention in the before described lock, and for which I ask a
patent are the guards the plates of tin placed between them, the checks the
levers and bar the application of the double bitted key to this lock and
the mode of operating the several parts as before described.

Witnesses
Wm P Elliot
Thomas Lloyd

James McClary

Ex?
Ch.G.W.

1172 [illegible]

Drawing